(No Model.) 3 Sheets—Sheet 1.
D. W. G. HUMPHREY.
BUTTON HOLE SEWING MACHINE.
No. 273,087. Patented Feb. 27, 1883.
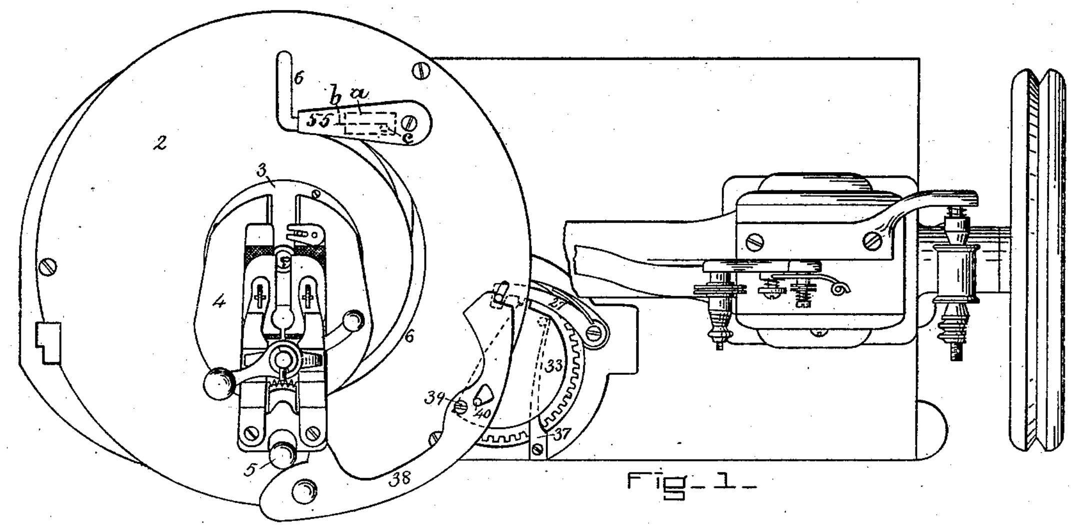
Fig_1_
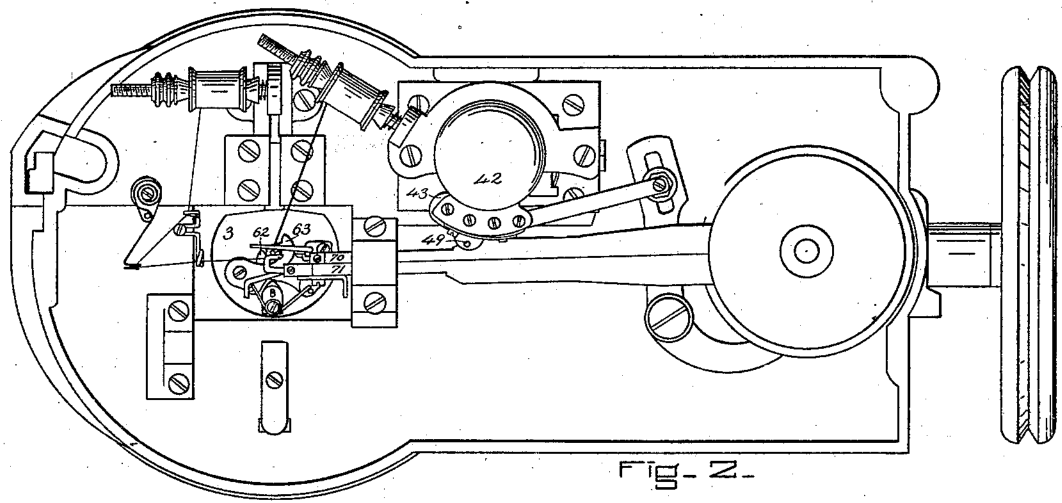
Fig_2_
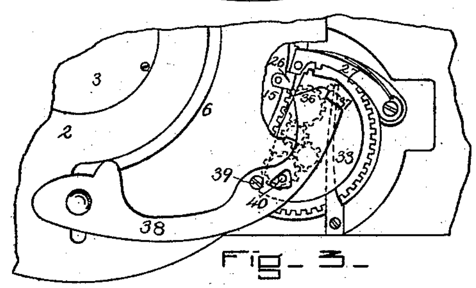
Fig_3_
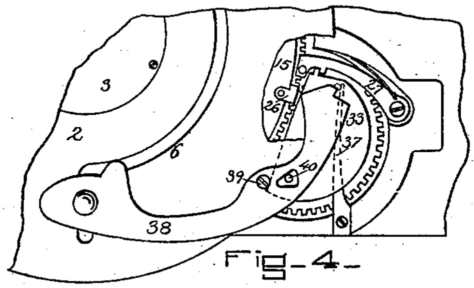
Fig_4_
WITNESSES
Thomas W. Porter
Ebeu Hutchinson
INVENTOR
Daniel W. G. Humphrey
per Eugene Humphrey
his Atty.
N. PETERS. Photo-Lithographer. Washington, D. C.

(No Model.)
3 Sheets—Sheet 2.
D. W. G. HUMPHREY.
BUTTON HOLE SEWING MACHINE.
No. 273,087. Patented Feb. 27, 1883.
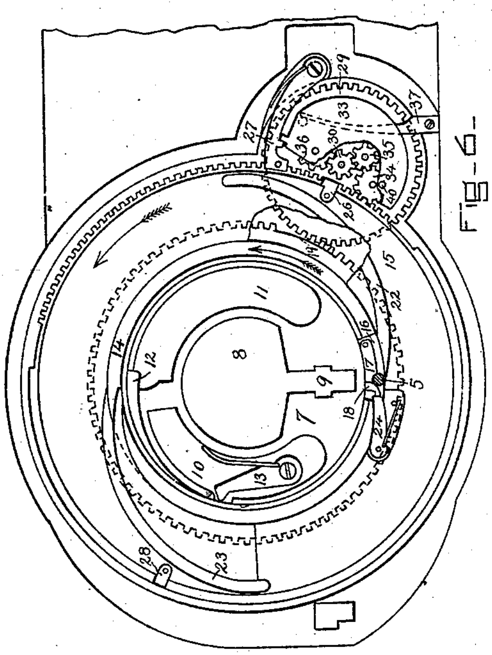
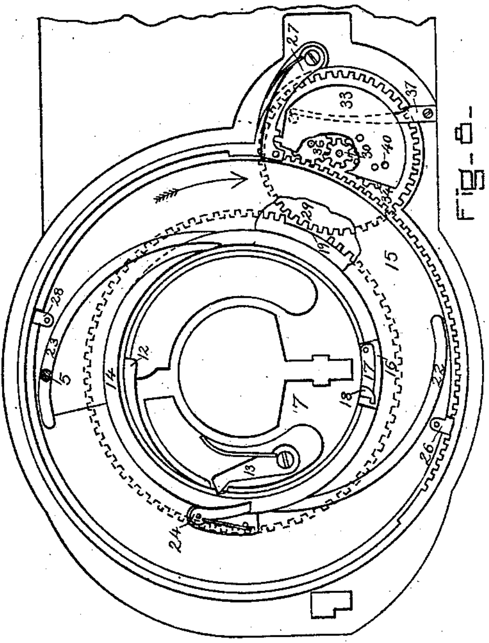
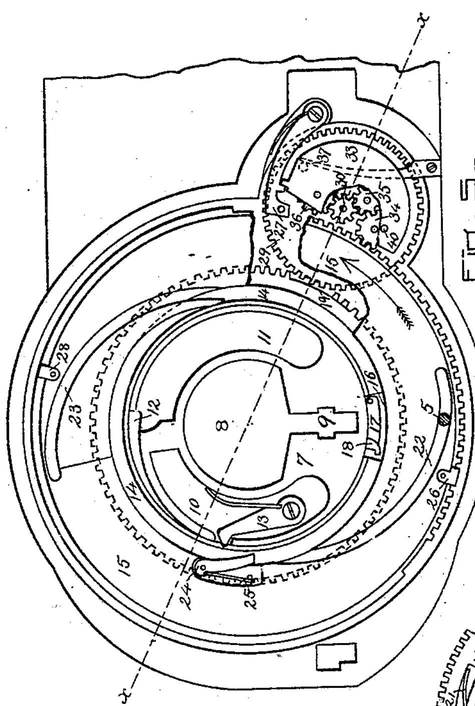
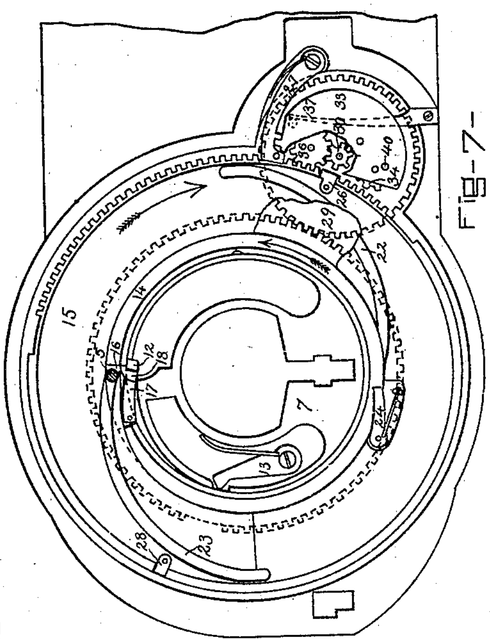
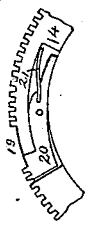
WITNESSES
Thomas W. Porter
Eben Hutchinson
INVENTOR
Daniel W. G. Humphrey
per Eugene Humphrey
his Atty.
N. PETERS. Photo-Lithographer, Washington, D. C.

(No Model.) 3 Sheets—Sheet 3.

D. W. G. HUMPHREY.

BUTTON HOLE SEWING MACHINE.

No. 273,087. Patented Feb. 27, 1883.

WITNESSES

Thomas W. Porter

Eben Hutchinson

INVENTOR

Daniel W. G. Humphrey per Eugene Humphrey his atty.

N. PETERS, Photo-Lithographer, Washington, D. C.

UNITED STATES PATENT OFFICE.

DANIEL W. G. HUMPHREY, OF CHELSEA, ASSIGNOR TO SAMUEL F. HOWARD, TRUSTEE, OF BOSTON, MASSACHUSETTS.

BUTTON-HOLE SEWING-MACHINE.

SPECIFICATION forming part of Letters Patent No. 273,087, dated February 27, 1883.

Application filed November 24, 1882. (No model.)

*To all whom it may concern:*

Be it known that I, DANIEL W. G. HUMPHREY, of Chelsea, in the county of Suffolk and State of Massachusetts, have invented a new and useful Improvement in Button-Hole Stitching-Machines, which invention is fully set forth in the following specification, reference being had to the accompanying drawings.

Figure 12:
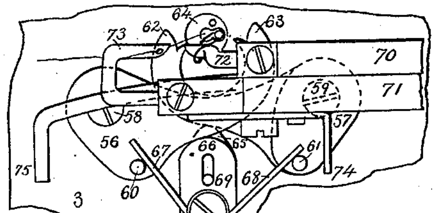
Figure 13:
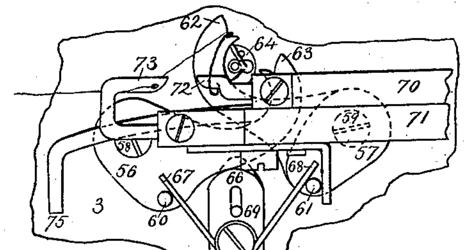
Figure 14:
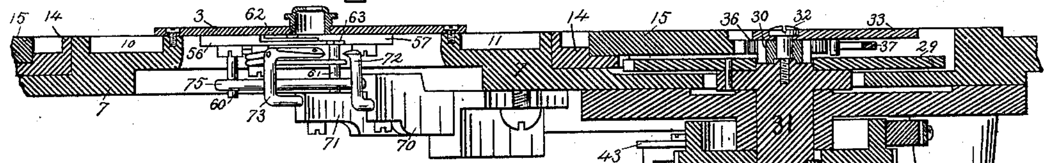
Figure 15:
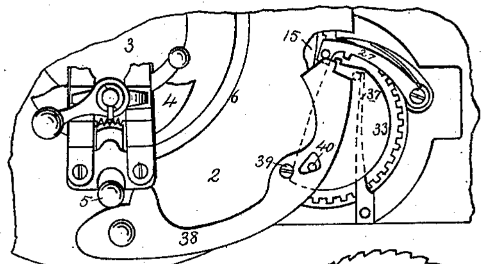
Figure 16:
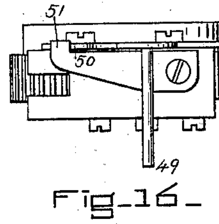
Figure 17:
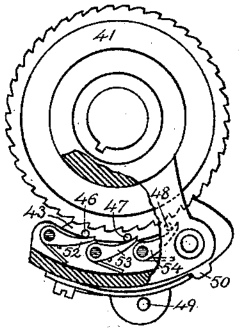
Figure 18:
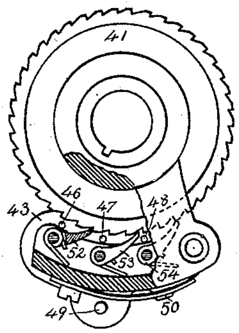

Figure 1 of the drawings is a top view of the bed of a button-hole stitching-machine embodying my invention, and of a portion of the usual overhanging "goose-neck," the outer part being broken off. Fig. 2 is a plan of the under side of the machine. Figs. 3 and 4 are detached top views, showing in different positions the feed actuating and reversing devices. Figs. 5, 6, 7, and 8 are top views of the feeding devices located beneath the work-plate in the recessed bed, the plate and clamp shown in Fig. 1 being removed, and said feeding devices being shown in various positions which they occupy relatively to each other during the process of stitching a button-hole. Fig. 9 is a segment of the inner feed-wheel, showing a recess in the under side thereof, in which a number of yielding teeth formed on a steel plate are secured by a pivot and supported by a spring. Figs. 10, 11, 12, and 13 are detached views, showing the plan of the loop-spreading devices attached to the under side of the central work-plate, and the under needles in the various positions which they occupy in performing their functions. Fig. 14 is an enlarged vertical section taken on line $x$ $x$, Fig. 5, when the central work-plate, with its button, and the plate of the driving-pinions are in position and complete, and also showing portions of the under needle-bars, the needles, and loopers in side elevation. Fig. 15 is a detached top view of a part of the feed actuating and reversing devices, shown in connection with the clamp when the latter is employed to operate the reversing mechanism. Figs. 16, 17, 18, and 19 are views illustrating the construction and operation of the device for disengaging the feed-ratchet pawls from the ratchet-wheel to enable the wheel to be turned freely by hand in a backward direction when desired.

The left-hand or forward end of the bed of the machine is constructed with a circular recess of unequal depths, in which two feed wheels or rings lie horizontally, and are moved about a central hub in the manner and for the purposes hereinafter described. The overhanging stitching mechanism above said bed may be of the usual construction in button-hole machines, employing a perforating-needle having both a vertical reciprocating movement and a horizontal to-and-fro motion for carrying its thread through and over the edge of the button-hole, and working in connection with a cloth-clamp, and it forms in itself no part of my invention herein described.

My present invention relates chiefly to improvements in the feeding mechanism, and in the loop-spreading devices arranged beneath the work-plate; and it consists in the construction and combination of the several devices embodied therein, as hereinafter more fully and particularly set forth and claimed.

Referring to Fig. 1 of the drawings, number 1 is the bed or iron table of the machine.

2 is the work-plate, constructed in two parts, the outer part covering the feed-wheels when screwed down upon the bed, as shown, and being removable to get at said wheels independently of the central part, 3, to which the loop-spreaders are attached upon the under side, and which part is separately secured to the bed by screws, as shown.

4 is the base of the cloth-carrying clamp. This clamp is of common construction, having the usual clamp-pin, 5, which extends downward, under spring-pressure, through the clamp-base and the guiding-slot 6 in the work-plate, and into the groove in the actuating feed wheel or ring beneath the plate. In the recess referred to, beneath the work-plate, lie the feed-wheels, Figs. 5, 6, 7, 8, employed in actuating said clamp through its pin 5.

A part of the machine-bed is formed into a circular central hub, 7, having an opening, 8, through which the vertical perforating-needle operates in the process of stitching, also an opening, 9, forming a passage for the insertion and operation of a cutter-block when a cutting attachment is employed. Said hub is also recessed at 10 and 11 and notched in its periphery at 12, the recess 10 containing a spring-pawl, 13, operating, through an opening in the periphery of the hub, against the rim of the inner feed wheel or ring, 14, as shown. Said ring 14 is of various degrees of thickness. Next to its axial support (hub 7) it fills the depth of recess which it occupies to the top of the hub, or to the level of the under side of the work-plate which secures it in its recess, when the plate is screwed down upon the bed. At a little distance from the hub it is reduced about one-third in thickness, and beyond that its outer and toothed portion is reduced to about one-third of its full thickness, and this latter portion underlies the outer feed-wheel, 15, as more fully shown in Fig. 14, and the outer wheel turns about the next thicker part of the inner ring, which forms a central hub or axial support for the same. Said inner ring, Fig. 5, carries in a sunken recess, 16, formed therein next to the hub, a pivoted driver, 17, the upper surface of the main body of which is sunk to the level of the second degree of thickness of the ring, while the hook 18, formed on the driver, rises nearly to the level of the top of the thickest part of the ring, just clearing the under surface of the work-plate.

The entire periphery of the inner wheel or ring is provided with gear-teeth, except a small vacancy, 19, and at this point the ring is recessed on its under side, and a steel plate, 20, Fig. 9, provided with a number of teeth corresponding with those cut in the ring, is pivoted to the ring in said recess, and held with its teeth in proper relative position by spring 21, as shown. The object of these yielding teeth will be hereinafter explained.

The outer feed-wheel, 15, as already explained, fits around a portion of the inner wheel, as upon a hub, and rests in said recess at less depth than the inner wheel and over the toothed portion of the latter. In the upper side of this outer wheel there is a curved groove, 22, into which the lower end of the clamp-pin 5, before referred to, projects when in working position. This groove leads to the inner wheel, and the outer and longer side of the same forces the pin onto the inner ring, as will be explained. There is also in said wheel a groove, 23, the outer and shorter side of which is formed by a cut in the wheel, and the inner and longer side by an inserted piece having the proper outline, and projecting inwardly across the path of the clamp-pin and its driver on the inner wheel to receive said pin from the inner ring, as will be hereinafter explained.

The outer wheel is also provided with a pawl, 24, pivoted in a sunken recess in the upper face of the wheel and at its inner circumferential line, which pawl has its outer end secured in position in the path of the driver on the inner ring by a spring, 25, one end of which is attached to the pawl, while the other end rests between the back of the recess in which the pawl is seated and a small pin inserted therein, as shown. This pawl is employed as a starter of the inner wheel or ring, as will be explained.

The outer wheel, not being required to make a complete revolution, has teeth only on a portion of its periphery, as shown. It is provided with a small projecting plate or lug, 26, inserted and riveted to the wheel, which, when the wheel is turned in the direction indicated by the arrow thereon, Fig. 5, and to the requisite extent, comes in contact with the outer end of the pivoted spring-latch 27, Fig. 3, to force the same out of contact with plate 33, as shown. It is also provided with a lug, 28, similarly attached and arranged to strike against a downward-projecting pin in the work-plate, merely as a check to the wheel when moved in a backward direction by hand, and to avoid carrying it beyond the contact of its driving-pinions, and thus getting it out of gear.

Having described the construction and arrangement of the two principal feed-wheels, I will now refer to the immediate devices for actuating the same, consisting of a system of pinions located in a side recess formed in the bed, as shown, and devices for engaging and disengaging two of said pinions with the outer feed-wheel.

The inner feed-wheel revolves around the central hub, 7, in one direction only, (indicated by the arrow marked thereon in the figures representing it when in motion, Figs. 6, 7,) and has a faster movement than the outer wheel, its driving-pinion being one-half the diameter of the wheel. The outer wheel turns upon the inner with a slower rotary reciprocating movement, going in one direction about one-third of a revolution, and its driving-pinion being about one-twentieth the diameter of the wheel.

Movement is imparted to the inner ring or wheel by the large underlying pinion 29, which extends into the larger recess in the bed beneath the outer wheel, as shown, Fig. 14. This pinion 29, together with the smaller central pinion, 30, is secured to the vertical feed-shaft 31, pinion 29 being secured to the flange formed on the upper end of the shaft by riveting, as shown, said pinion 30 being grooved on the under side to receive a tongue milled on the upper end of the shaft, and then secured to said shaft by a screw, 32. A plate, 33, Figs. 5 and 14, is pivoted upon said screw 32, and to this plate (shown broken away around its center in said Fig. 5) are attached three pinions, 34 35 36, which serve as intermediates between the central pinion, 30, and the outer feed-wheel, 15. The plate to which these intermediate pinions are attached, being rocked upon its pivotal screw 32, brings pinions 34 and 36 alternately into gear with the outer feed-wheel, 15, which they thus actuate in opposite directions. The rocking of the plate 33 and its pinions is effected in one direction, by the force of spring 37 operating against a pin in the under side of the plate, to force pinion 36 into gear with wheel 15 and in the opposite direction to throw pinion 34 into gear with said wheel, and at the same time to disengage pinion 36 by a lever, 38, above the work-plate, Figs. 1, 3, 4, 15, pivoted at 39 and operating against a pin, 40, projecting up from said plate 33 into a slot in said lever, as shown, the forward end of the lever being drawn back by contact with the clamp, Figs. 1, 15, when that is being placed in position by the operator to commence stitching a button-hole, or by the hand of the operator, independently of the clamp, as may be preferred. When the forward end of lever 38 is thus drawn back its opposite end, which is formed with reference to such action and purpose, forces back the spring-latch 27 by contact with an upwardly-projecting pin in the end of said latch, Fig. 15, and thereby releases plate 33 from the latch before the lever acts on pin 40, sufficient play being allowed in the slot through which said pin projects for that purpose. While the back end of lever 38 is thus holding the latch 27 out of contact with the pivoted pinion-plate, its outer end being drawn forward, as described, the side of the slot is forced against pin 40, and thus the plate 33 is turned on its pivot 32 against the resistance of spring 37, and thereby pinion 34 is moved into gear with wheel 15, while at the same time pinion 36 is disengaged from the same, and latch 27 being released by lever 38, its spring returns it into contact with the pinion-plate, with the spur with which it is provided engaged with a corresponding spur on the edge of said plate, thus locking the pinions in their changed position, as shown in Figs. 5 and 6, this latch 27 thus serving to lock the pinion-plate whichever pinion is in gear with the feed-wheel.

The practical operation of the feed wheels or rings 14 and 15 in actuating the cloth-clamp is as follows: The clamp being placed in position to commence stitching the longest button-hole of which the machine is capable, as shown in Fig. 1, its pin 5 projects downward through a straight portion of the guiding-slot 6 in the work-plate 2, (concealed by the clamp in said figure,) and into the groove 22 in the outer feed-wheel, Fig. 5, as shown. The machine being put in operation, all the pinions which have just been described will be actuated by the means hereinafter referred to. The large pinion 29 will revolve ineffectually at first in the vacancy 19, the inner feed-ring, 14, through the omission of teeth at 19, remaining at rest, while pinion 34 will move the outer wheel, 15, in the direction indicated by the arrow thereon, Fig. 5, with the usual intermittent feed movement. The outer wheel thus progressing, by its groove 22, forces the clamp-pin 5, which is at the same time guided by the slot in the work-plate, directly along to the inner wheel, 14, depositing it thereon in front of the driver 18, as shown in Fig. 6. Just as the clamp-pin reaches this position the starter 24 on the outer wheel will have come in contact with driver 18, and thereby have started the inner wheel, 14, sufficiently to have moved it into gear with its driving-pinion at 19, when the inner wheel, moving at a greater speed, travels away from said starter, carrying or driving the clamp-pin around the semicircle, while the eyelet end of the button-hole is being stitched, and into the relative position shown in Fig. 7. At this point the driver 18, being unsupported by the hub 7, is forced by the clamp-pin 5 into the notch 12 in said hub, and thus passes the pin. In arriving at this position, with its pin ready to be acted upon by groove 23 in the outer wheel, and to be carried or forced into the straight portion of slot 6 in the back side of the work-plate, the clamp pressed aside and passed a pivoted arm, 55, on the top of the work-plate, Fig. 1. Beneath said arm is a slot or recess in the work-plate, in one end of which is secured the end of a straight spring, the free end of which extends toward the pivot of said arm. A short pin in the under side of said arm, and near its pivot, projects down into and rests between the side of said recess and the free end of said spring, all as shown by dotted lines *a b c* on said arm 55, *a* representing said recess, *b* said spring, and *c* said pin. Thus said arm is held in the position shown, with its outer end across the slot 6 in the work-plate, being rigidly supported by the side of the recess next to the passing clamp, while the spring allows it to yield in the opposite direction to allow the clamp to pass, when traveling through the circular slot 6, into the position last described. The purpose of said arm 55 is to support the clamp against the tendency to move backward at the time when the pin is taken up by groove 23, Fig. 7, after it has been released by the driver 18 and before it has fairly entered the straight part of slot 6 in the work-plate, Fig. 1, the outer end of said arm 55 serving practically to close slot 6, at the point where it crosses it, against a retrograde movement of the clamp, as would a prolongation of the short side of said slot at the time when the clamp-pin has got into position to enter the same, as described. During this movement of the inner wheel the outer wheel, 15, has traveled in the direction it started until lug 26 came in contact with latch 27, Fig. 3, and released plate 33 therefrom, allowing the force of spring 37 to act upon a pin in the plate to rock the same, and thereby disengaged pinion 34 from wheel 15, and forced pinion 36 into gear with the same, thus reversing the movement of wheel 15. This change took place when the inner ring, 14, had completed a quarter-revolution, and when the inner end of groove 23 in the outer wheel had passed beyond the point where it is shown in Fig. 7; but while the inner ring, 14, was completing its second quarter-revolution the outer wheel had slowly traveled back, bringing its groove 23 into the position shown, ready to receive the clamp-pin. The groove 23 now takes up the clamp-pin 5, and the said reverse movement of its wheel continuing, it carries the pin, assisted by arm 55, and guided by slot 6, Fig. 1, directly out to the position shown in Fig. 8, while the last side of the button-hole is being stitched. While the outer wheel is thus completing the feeding of the clamp on the last side of the button-hole the inner wheel, 14, has traveled around until the vacancy 19 in its teeth is reached, when it stops again in the position started from, and is secured in such position, from displacement by the frictional contact of the outer wheel moving upon it or from any other cause, by the friction-pawl 13, which projects through an opening in hub 7 and into a notch in the rim of said inner wheel, as shown in Fig. 5. The pawl thus holds the wheel in place by force of its spring, which is overcome when the starter 24 strikes the driver 18. If preferred, this holding of the inner wheel may be made positive by forming a square notch in the rim of the wheel and making the projecting end of the pawl to conform to the same, and then providing for a release of the ring by means of a suitably-shaped plate attached to the outer wheel and arranged to come in contact with and crowd said pawl out of its notch in the inner wheel just in advance of the starter's coming in contact with said driver 18. When the said starter comes in contact with the driver, as described, to move the inner wheel into gear with its driving-pinion, while the latter is revolving idly in said vacant space 19 to avoid any shock or accident from misgearing when said wheel and pinion are thus brought into contact, I employ the yielding teeth on plate 20, Fig. 9, before referred to, which readily adjust themselves to any slight relative peripheral displacement of the teeth of said wheel and pinion, and bring the same smoothly into gear without shock or damage. By this construction and movement of the outer wheel, 15, one great advantage is obtained—namely, when a button-hole of any given length is finished and the machine is stopped the wheel always stands in the right position to receive the clamp-pin into its groove 22 when the clamp is swung around to commence stitching another button-hole of the same length, thus avoiding the necessity heretofore existing of "hand-ratcheting," or changing the position of the wheels by the hand of the operator, preparatory to starting anew, and saving the time thereby lost to the stitching operations of the machine, relieving the operator from much wearisome labor, and greatly facilitating the accomplishment of the purposes of the machine; and this constitutes an essential feature of my present invention. A shorter button-hole than the full length for which the feed movement has just been described is started in the usual way by moving the feed forward by hand until the clamp is in proper position on the work-plate relatively to the perforating-needle to commence stitching a button-hole of the desired length. After thus placing the feed right for the first hole, then so long as button-holes of the same length are to be stitched no further adjustment of the feed by hand will be required, as no matter what the length of the first hole may be at the completion of the stitching of such hole the feed-wheels will be in position to commence another hole of the same length by simply swinging the clamp around into position on the work-plate, and without any movement or adjustment of the feed by hand or otherwise; and the construction and arrangement whereby the inner ring, 14, is allowed to remain at rest during the stitching of the greater portion of the button-hole, instead of continuously running at its higher speed, saves much wear upon said ring, and also admits of an adjustment of the speed of the same relatively to the outer wheel, without getting the two out of time with reference to their actions upon the clamp-pin, which could not otherwise be so easily accomplished.

Another important feature or part of my present invention relates to a device whereby I readily release the feed-shaft 31, Fig. 14, and its actuating ratchet wheel 41 from the ratchet-pawls, so that the said shaft may be turned by the hand-wheel 42 in either direction, thus enabling the operator to thereby move the clamp backward or forward expeditiously, and without being obliged to disconnect the clamp from the feed-wheels by raising the pin out of the feed-grooves, and then sliding it on the work-plate and ratcheting the wheels around till they are in position corresponding to the changed position of the clamp, when the clamp-pin can drop into the grooves again, as has hitherto been necessary and very inconvenient. The ratchet-wheel 41, attached to shaft 31, is operated by a plurality of pawls contained in a vibrating carrier in the usual manner. There is nothing new in the construction, arrangement, and mode of operation of the carrier, its pawls, and the ratchet-wheel whereby shaft 31 and the pinions attached thereto, as before described, are actuated.

Figure 19:
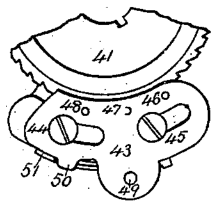

My improvement in detail consists in a slotted plate, 43, Fig. 19, attached to the upper side (when the machine is in working position) of the pawl-carrier by screws 44 and 45, on which said plate is arranged to slide. The plate is provided with a number of pins, 46 47 48, equal to the number of ratchet-pawls employed. Each of these pins extends across the pawl-carrier and parallel to the pivot of the pawl on which it is intended to act. The plate is also provided with a finger-stud, 49, Figs. 14, 15, by which it is moved by the operator. It is also formed with a lip, 50, which acts against a retaining-spring, 51, which exerts sufficient force on the plate, on one side or the other of said lip, to keep it in the position to which it is moved by the operator and from displacement by accident. When the plate is not in position to disengage the pawls from the ratchet-wheel 41 its pins 46 47 48 rest in the positions relatively to said pawls shown in Fig. 18; but when it is desired to release said ratchet-wheel from its pawls 52 53 54 the operator places his finger against stud 49, and thereby slides plate 43, with its pins 46 47 48, from the position shown in Fig. 18, to the position shown in Fig. 17, where the pins come in contact with said pawls, so as to force them back upon their springs, releasing them from the ratchet-teeth, as shown in said Fig. 17, thus leaving the ratchet free to be turned with shaft 31 by hand-wheel 42 in either direction, for the purpose stated.

Another part of my present invention is embodied in the following-described loop-spreading devices: To the under side of the central work-plate, 3, are attached two similarly-formed loop-spreaders, 56 and 57, Figs. 10, 11, 12, 13, one pivoted to the plate at 58 and the other at 59, and provided with studs 60 and 61, by which they are turned on their said pivots. They are also formed at their outer ends, 62 and 63, with points adapted to seize and hold the thread of the loops they are designed to spread, and are pivotally arranged so that their outer ends and points shall move in curves suitable to the position of the needle-throat 64. When at rest the backs of the spreaders are held against the edges of adjustable plates 65 66 by force of the arms 67 68 of the spring 69, which, together with said adjustable plates, is screwed to the work-plate, as shown. The reciprocating bars 70 and 71 carry respectively the usual "looper-point," 72, and "under needle," 73, and are actuated by suitable cams in the ordinary way. Said bars also carry in this case what is not usual—namely, the bent plate 74, screwed to the under side of needle-bar 71, and the bent wire 75, inserted and secured by set-screw in the looper-bar 70. The wire 75 operates spreader 56 in one direction against the force of spring-arm 67, and the bent plate 74 operates spreader 57 in one direction against the force of spring-arm 68. The cams which actuate the bars 70 and 71 are so grooved as to give the requisite movements to the under needle and looper-point to enable them to perform their respective functions in the usual manner, except that they are ordinarily both employed in one bar, so that while one is performing its office the other is moved without effect, while in my arrangement herein described, when the needle-bar is engaged in moving its needle 73 and the looper-bar is not required to move its looper-point 72, the time which the looper-bar might otherwise be idle, so far as the office of the looper-point is concerned, is utilized by imparting an extra and unusual movement to that to operate spreader 56 through the bent wire 75, and a similar utilization of what might otherwise be idle time with the under needle-bar is had for the purpose of operating spreader 57 through the bent plate 74, the actuating-cams being so modified in the form of their grooves as to afford these additional movements in proper time.

Figure 10:
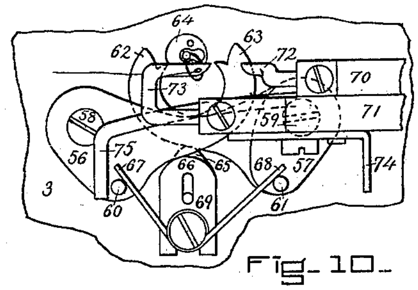
Figure 11:
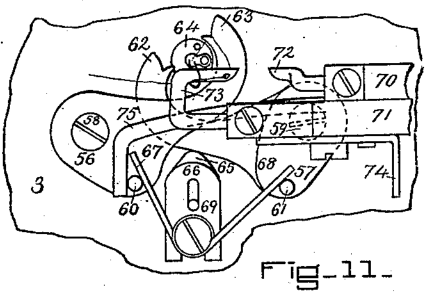

The practical operation of the spreaders 56 and 57 is as follows: Fig. 10 represents a loop of the upper thread, formed when the vertically-reciprocating needle or upper needle descended through the cut of the button-hole and the inner end of the needle-throat, and left around the point of the under needle, 73, which is just moving forward into the same. Fig. 11 shows the under needle fully advanced into said loop with its under thread. While this movement of the under needle was taking place, the looper-point 72 having no office to perform, its bar was moved so as to bring wire 75 into contact with stud 60, and, by a continuance of the movement, to swing point 63 of spreader 56 into the position shown, during which movement, properly timed to the movement of the under needle, said spreader-point seized the thread of the under needle and opened it out into an angular loop, extending from the cloth, through the needle-throat and over the point of the spreader, to the eye of the under needle, as shown, opening said loop across the needle-throat in such manner as to form a clear passage through the same for the upper needle at its next descent through the edge of the button-hole and the outer end of the needle-throat. The upper needle having made such descent and the under needle having retreated from its former loop, the looper-point 72 has advanced into the second loop of the upper thread, as shown in Fig. 12. In Fig. 13 the looper-point has completed its forward movement, and during its advance, the under needle having no office to perform, the otherwise idle time of its bar has been employed to move the arm of plate 74 into contact with stud 61, and, continuing, has carried point 62 of spreader 57 into the position shown, during which properly-timed movement said spreader-point seized one side of the loop of upper thread, hanging around the looper-point, and opened it out into an angular loop, extending from the cloth through the needle-throat and around the looper and spreader points, as shown, and opening across the needle-throat in such manner as to form a clear passage through the loop for the upper needle at its next descent through the button-hole cut. Thus by this arrangement and movement of the spreaders the loops are spread in the directions which most effectually insure the passage of the upper needle through the same and avoid the liability to skip stitches.

What I claim as my invention is—

1. In a button-hole stitching-machine having a clamp-feed, the reversible wheel 15, provided with grooves 22 and 23, arranged to alternately actuate the clamp when the wheel is moved in opposite directions, substantially as and for the purposes specified.

2. The feed-ring 14, constructed with a vacancy, 19, in its peripheral teeth, and provided with yielding teeth 20, substantially as and for the purposes specified.

3. The wheels 14 and 15, constructed and arranged substantially as described, combined with mechanism for imparting to the wheel 14 an intermittent rotation in one direction at intervals and for imparting to the wheel 15 an intermittent rotation in opposite directions, as set forth.

4. The outer and inner wheels, 14 and 15, in combination with mechanism for rotating the same, as described, said inner wheel being so constructed that it may at times be disengaged from its actuating mechanism, and is thereby permitted to remain at rest during a portion of the time that the outer wheel is being operated, substantially as specified.

5. The outer and inner wheels, 14 and 15, in combination with mechanism for operating the same, as described, the said wheels being so constructed that the inner wheel is adapted, after each of its periods of rest, to be set in motion by the movement of the outer wheel, substantially as specified.

6. The combination of a feed wheel or wheels, for imparting the requisite movements to the cloth-clamp, with an axial support or hub, 7, provided with an interior opening, 9, for the insertion of a cutter-block, substantially as and for the purposes specified.

7. The wheels 14 and 15, constructed and arranged to operate together, as described, and combined with a retaining-pawl, 13, whereby wheel 14, when at rest, is secured against displacement by frictional contact until positively set in motion by the action of wheel 15, substantially as and for the purposes specified.

8. The combination and arrangement of wheel 15, provided with a starting-pawl, 24, with wheel 14, provided with a driver, 18, whereby the inner wheel, when at rest, is started by the movement of the outer wheel, substantially as and for the purposes specified.

9. The combination of wheels 14 and 15, actuated by suitable mechanism in the manner described, with the slotted work-plate 2 and clamp 4, substantiallly as and for the purposes specified.

10. In combination, the slotted work-plate 2 and the yielding arm 55, whereby the clamp is prevented from making a backward movement when its pin is acted upon to carry it out of the curved part of slot 6, substantially as specified.

11. In combination with wheels 14 and 15, the actuating-pinions 29 and 30, attached to the feed-shaft 31, the rocking pinion-plate 33, with its intermediate pinions, 34 35 36, and suitable devices for rocking said plate, so as to alternately bring pinions 34 and 36 into gear with wheel 15, all substantially as and for the purposes specified.

12. In combination, the rocking pinion-plate 33, spring 37, pivoted spring-latch 27, pinions 30 34 35 36, and lug 26 on wheel 15, whereby the contact of said lug with the latch 27 releases the pinion-plate to be actuated on its pivot by spring 37, and pinion 34 is thus disengaged from while pinion 36 is forced into engagement with and reverses the direction of wheel 15, all substantially as and for the purposes specified.

13. In combination, lever 38, pivoted at 39, plate 33, pivoted at 32, latch 27, and pinions 30 34 35 36, whereby when the forward end of lever 38 is drawn back, as described, its opposite end releases plate 33 from latch 27, and by acting upon pin 40 in said plate rocks the plate against the force of spring 37, thereby disengaging pinion 36 from and forcing pinion 34 into gear with wheel 15, thus reversing the direction of said wheel, substantially as and for the purposes specified.

14. In a button-hole stitching-machine embodying a feed mechanism actuated by a ratchet-wheel, as described, the combination, with such ratchet-wheel and its actuating-pawls, of mechanism, constructed and arranged to be actuated by the hand of the operator, to disengage the pawls from the ratchet-wheel and hold them inoperative, substantially as and for the purposes specified.

15. In combination with ratchet-wheel 41 and its pawl-carrier, the sliding plate 43, attached to the carrier, and provided with detaching-pins 46 47 48, corresponding in number to the pawls employed, with a finger-stud, 49, and retaining-spring 51, substantially as and for the purposes specified.

16. In combination with an under needle, 73, and a looper, 72, independently actuated by reciprocating bars, a spreading device actuated by the looper-bar, whereby a loop of the under-needle thread is opened to admit the upper needle with its thread, substantially as specified.

17. In combination with a looper, 72, and an under needle, 73, independently actuated by reciprocating bars, a spreading device actuated by the under-needle bar, whereby a loop of the upper-needle thread is opened to admit the same needle at its next descent, substantially as specified.

18. In a button-hole stitching-machine employing a laterally-vibrating perforating-needle, the combination of a pivoted spreader, 56, provided with a stud, 60, a looper-bar, 70, suitably actuated and provided with an arm, 75, to act on stud 60, a spring, 67, and an adjustable supporting-plate, 66, all substantially as and for the purposes specified.

19. In combination, a pivoted spreader, 57, provided with a stud, 61, a needle-bar, 71, suitably actuated and provided with an arm, 74, to act on stud 61, spring 68, and the supporting-plate 65, all substantially as and for the purposes specified.

20. In combination with the under needle, 73, and the looper 72, the spreaders 56 and 57, pivotally arranged beneath the work-plate, so that when actuated, as described, their pointed ends 62 and 63 will each move in the arc of a circle and contrary to the advance, respectively, of the said needle and looper, thereby giving to the loops a desired backward spread to insure the entrance of the upper needle into the same, substantially as and for the purposes specified.

21. The construction, combination, and arrangement of the work-plate in two parts, whereby part 2, which covers the feed-wheels, and part 3, which covers and supports the loop-spreaders, may each be removed to get at its underlying mechanism without disturbing the other, substantially as specified.

DANIEL W. G. HUMPHREY.

Witnesses:
THOMAS W. PORTER,
EUGENE HUMPHREY.